United States Patent [19]
Aucktor et al.

[11] 4,229,952
[45] Oct. 28, 1980

[54] HOMOKINETIC UNIVERSAL JOINT

[75] Inventors: Erich Aucktor, Offenbach; Wolfgang Rubin, Hanau, both of Fed. Rep. of Germany

[73] Assignee: Lohr & Bromkamp GmbH, Offenbach am Main, Fed. Rep. of Germany

[21] Appl. No.: 11,945

[22] Filed: Feb. 13, 1979

[30] Foreign Application Priority Data

Feb. 24, 1978 [DE] Fed. Rep. of Germany ...... 2807921

[51] Int. Cl.³ .................. F16D 3/30; F16D 3/02; F16D 3/16; F16D 3/50
[52] U.S. Cl. ........................................... 64/21; 64/7; 64/8
[58] Field of Search .................. 64/21, 7, 8, DIG. 1

[56] References Cited

U.S. PATENT DOCUMENTS

| | | | |
|---|---|---|---|
| 2,010,899 | 8/1935 | Rzeppa | 64/7 X |
| 2,128,088 | 8/1938 | Hanft | 64/21 |
| 3,324,683 | 6/1967 | Schroter | 64/21 |
| 3,678,706 | 7/1972 | Shirley et al. | 64/7 |
| 3,714,798 | 2/1973 | Macielinski | 64/21 |

*Primary Examiner*—Henry K. Artis
*Attorney, Agent, or Firm*—Toren, McGeady and Stanger

[57] ABSTRACT

In a homokinetic universal joint, an inner joint member extends into the hollow space formed within an outer joint member. Each of the inner and outer joint members has an axially extending check pin located within the hollow space with the pins extending toward one another. The check pins have an axial length which prevent the angular relation between the inner and outer joint members from being less than 20°.

2 Claims, 1 Drawing Figure

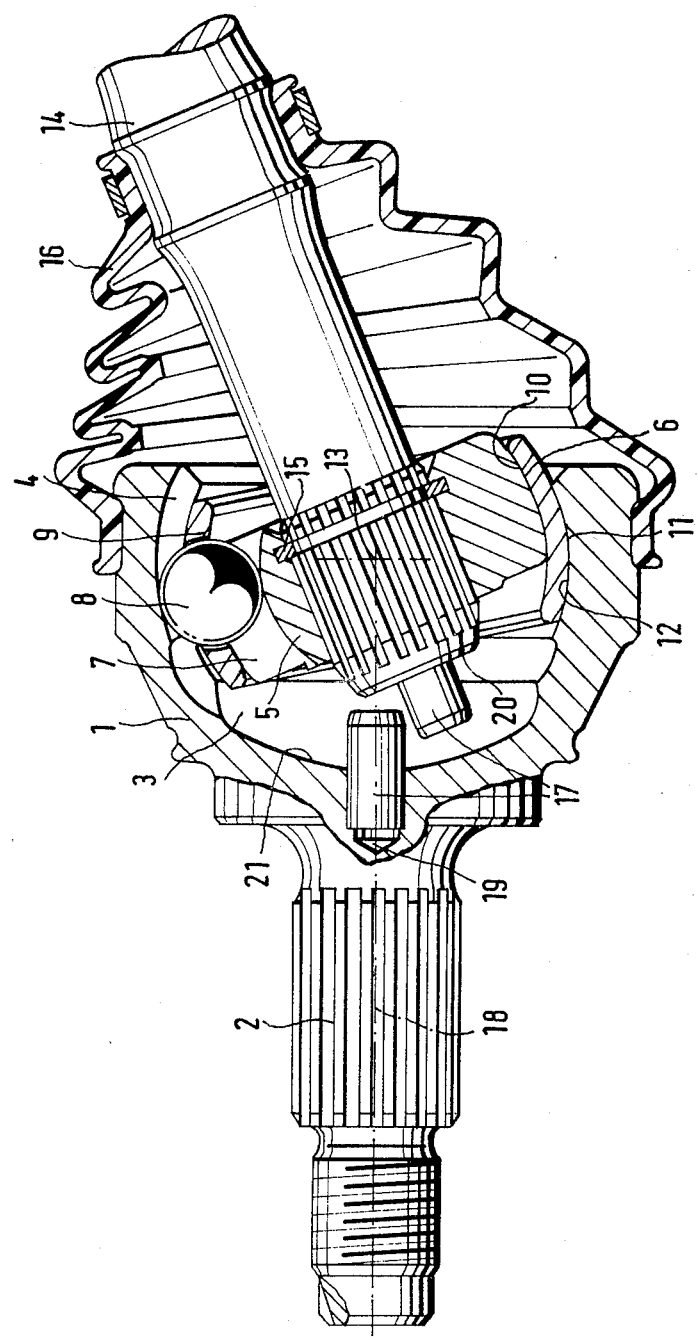

1

HOMOKINETIC UNIVERSAL JOINT

SUMMARY OF THE INVENTION

The present invention is directed to a homokinetic or constant velocity universal joint which consists of an outer joint member forming a hollow space and an inner joint member positioned within the hollow space. The inner surface of the hollow space is spherically shaped and contains a number of spaced grooves and the outer surface of the inner joint member has similar grooves in its outer surface. The grooves of the inner and outer joint member are arranged in pairs with a ball seated in each pair of grooves. A cage is positioned between the outer surface of the inner joint member and the inner surface of the outer joint member and contains a number of apertures in which the balls are positioned. The inner and outer surfaces of the cage are spherically shaped with the outer surface guided on the spherical inner surface of the outer joint member and the inner spherical surface of the cage guided on the outer spherical surface of the inner joint member. The radii of the spherical surfaces on the outer joint member, the inner joint member and the cage and the generating radii of the ball grooves all have the same common center point.

There are known joints, note U.S. Pat. Nos. 1,665,280 and 1,916,442, in which the grooves for the balls of the inner and outer joint members are concentric to the center point of the joint. Moreover, the outer spherical surface of the inner joint member and the inner spherical surface of the outer joint member and the corresponding surfaces of the cage also have a center point which coincides with the center point of all of the ball grooves. This joint has the significant disadvantage in that it cannot function in the stretched position, that is where the axes of the joints are in alignment, since the control of the balls is not ensured in the angle-bisecting plane.

Accordingly, such a joint has to have an auxiliary control for exact operation in the stretched position. These joints, however, do not have such an auxiliary control.

Furthermore, there are known joints in which the ball grooves for controlling the balls in the angle-bisecting plane are staggered relative both to the hollow space in the outer joint member and the spherical outer surface of the inner joint member. Such joints have the disadvantage that the depths of the ball grooves, seen in the axial direction, very significantly in the inner and outer joint members and, when the joint has a large bending angle, the balls contact the edge facing toward the cage guiding surface.

Therefore, it is the primary object of the present invention, in view of the prior art, to provide a rigid joint in which a perfect constant velocity is ensured by means of the exact control of the balls for bending angles larger than 20° and, in addition, the joint is arranged so that bending angles less than 20° cannot be achieved.

In accordance with the present invention, the shaft mounting the inner joint member or the inner joint member itself includes a limiting or check pin extending axially into the hollow space within the joint and another axially extending check pin is provided on the outer joint member also extending into the interior of the hollow space with the check pins extending toward one another. If the inner and outer joint members could be arranged in the axially aligned or stretched position of the joint, the axial dimension between the oppositely disposed surfaces of the members is less than the total axial dimension of the check pins extending toward one another from the two members so that the check pins prevent the joint from assuming the stretched position.

This joint has the advantage that it cannot assume a bending angle between the axes of the two joint members which is smaller than 20°, because control of the balls is not possible in the range of such bending angles due to the special geometry of the joint. When the bending angle of the joint members is larger than or equal to 20°, an angle is formed between the grooves, that is, the grooves intersect one another. As a result of this arrangement, the balls are exactly guided within the grooves.

In the joint of the present invention, it is possible to provide a simple and inexpensive construction, since the cross sectional profile of the ball grooves is the same over the full length of each groove. Accordingly, there is optimum contact of the balls within the grooves of both joint members and in any angular position which it can assume. The service life of the joint is increased because of the depth of the grooves. Further, seizure of the cage due to a warped portion of the inner joint member is prevented, because the balls do not reach the edge region of the grooves during operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a side view, partly in section, of a homokinetic universal joint embodying the present invention.

DETAIL DESCRIPTION OF THE INVENTION

As shown in the drawing, a homokinetic or constant velocity universal joint consists of an outer joint member 1 and an inner joint member 5. Extending axially outwardly from the outer joint member 1 is an axle journal 2. The outer joint member 1 forms an inner hollow space 3 into which the inner joint member 5 extends. The joint has a center point 13 defined by the intersection of the axis of rotation 18 of the outer joint member 1 and the axis of rotation of the inner joint member 5. Concentric to the center point 13, grooves 4 are worked into the spherically shaped surface defining the hollow space 3 of the outer joint member 1. The inner joint member 5 has a spherically shaped outer surface 6 spaced inwardly from the spherically shaped surface of the outer joint member and grooves 7, also concentric to the center point 13, are worked into the spherically shaped outer surface 6. The grooves are spaced apart in the circumferential direction around the axes of rotation of each of the inner and outer joint members. As can be seen in the drawing, the grooves 4, 7 are disposed in pairs, opposite one another, with a ball disposed in each pair for transmitting torque between the inner and outer joint members.

Because of the particular arrangement of the grooves 4, 7, control is ensured only in instances where the bending angle between the two joint members is larger than approximately 20°, since in such instances the pairs of cooperating grooves intersect and the balls 8 are guided by the intersecting grooves. A ball cage 9 is positioned in the hollow space 3 between the spherically shaped surfaces on the outer joint member and the inner joint member. The cage has a number of openings or apertures through it which serve to receive and guide the balls 8. The cage has an annular configuration and its inner spherical surface 10 is guided on the spherically shaped outer surface 6 of the inner joint member, while its spherically shaped outer surface 11 is guided on the spherically shaped inner surface of the outer joint member 1. The inner joint member 5 has a bore extending along its axis of rotation and the surface of the bore is splined for receiving a similarly splined sectional shaft 14. A locking ring 15 secures the sectional shaft 14 within the bore in the inner joint member 5 preventing any relative axial movement between the two parts. Further, an accordian-like sealing boot 16 provides a seal for the hollow space 3 within the joint and the boot is mounted on the outer surface of the outer joint member 1 and on the outer surface of the sectional shaft 14 spaced axially outwardly from the connection between the sectional shaft and the inner joint member 5.

Due to the concentric arrangement to the center point 13 of the grooves 4, 7, of the spherically shaped inner surface 12 of the outer joint member 1, of the spherically shaped outer surface 6 of the inner joint member 5 and of the spherically shaped surfaces 10, 11 of the cage 9, the joint has a uniform ball guidance cross-section over the entire range of bending angles of the joint, that is, the depths of the grooves are constant over their length in the axial direction of the joint members. As a result of this arrangement, control of the balls 8 within the angle-bisecting plane is not possible in the stretched position of the joint, accordingly, the joint is intended for use only when the bending angle of the joint is 20° or larger. A limiting or check device positioned within the hollow space 3 renders it impossible for the joint to assume a bending angle smaller than 20°. The limiting device is provided by two check pins 17, one located on the axis of rotation 18 of the outer joint member 1 and this check pin can be pressed, screwed or connected in some other manner into a bore 19 formed in the outer joint member 1. The bore 19 extends axially inwardly from the hollow space 3 toward the axle journal 2. The other check pin 17 is connected to the sectional shaft 14 and extends in the axial direction of the shaft outwardly from its end within the hollow space 3. Though the check pin 17 has been indicated as connected to the sectional shaft 14, it is also possible to provide the check pin as a projection from the end of the sectional shaft by means of a suitable production procedure so that the sectional shaft and check pin are formed integrally in one piece. The check pins extend from the inner and outer joint members toward one another. The combined axial length of the check pins 17 is greater than the axial dimension between the facing surfaces of the outer joint member and inner joint member when they are in the stretched or axially aligned position. As a result, as can be noted in the drawing, the check pins 17 limit the angular arrangement of the inner joint member relative to the outer joint member to 20° or more, it is not possible, because of the check pins, for the inner and outer joint members to assume an angular position smaller than 20°.

While specific embodiments of the invention have been shown and described in detail to illustrate the application of the inventive principles, it will be understood that the invention may be embodied otherwise without departing from such principles.

What is claimed is:
1. A homokinetic universal joint comprising an outer joint member having a hollow space defined by an inner surface with a first part of said inner surface being spherically shaped, said hollow space having an axis laterally enclosed by the spherically shaped first part of said inner surface, said inner surface having a second part extending transversely of the axis of said inner space, first grooves formed in said first part of said inner surface and extending in the direction of the axis of said hollow space and spaced apart in the direction extending circumferentially around said axis, an inner joint member positioned within said hollow space and having an outer surface spaced inwardly from said inner surface of said outer joint member, said outer surface having a spherically shaped first part and a second part, said inner joint member having an axis encircled by said spherically shaped first part of said outer surface and said second part of said outer surface extending transversely of the axis of said inner joint member, second grooves formed in said spherically shaped first part of said outer surface extending generally in the axial direction of said inner joint member and spaced apart in the direction extending circumferentially about said axis of said inner joint member, said first grooves and said second grooves arranged in a number of oppositely disposed pairs of grooves with each said pair containing one said first groove and one said second groove, a plurality of balls located between said outer joint member and said inner joint member with each ball seated in one pair of said grooves for transmitting torque between said outer and inner joint members, a cage located between the outer surface of said inner joint member and the inner surface of said outer joint member and having a plurality of openings therein for each said ball for holding the balls between said inner and outer joint members, said cage having a spherically shaped outer surface and a spherically shaped inner surface with the outer and inner surfaces thereof being concentric, the radially outer surface of said cage being guided on the spherically shaped first part of said inner surface of said outer joint member and the spherically shaped inner surface of said cage being guided on the spherically shaped first part of said outer surface of said inner joint member, the radii of said spherically shaped surfaces on said outer joint member, said cage and said inner joint member and the generating radii of said grooves in said inner and outer joint members having a common center point, wherein the improvement comprises that said inner joint member comprises a first check pin located on said second part of said outer surface thereof and facing toward said second part of said inner surface of said outer joint member, said first check pin extending along the axis of said inner joint member, said outer joint member comprises a second check pin located on said second part of said inner surface of said outer joint member and facing toward said first check pin on said inner joint member, said second check pin extending along the axis of said outer joint member and the combined axial length of said first and second check pins being greater than the dimension between the facing second parts of said inner joint member and said outer joint member when the axes of said inner and outer joint members are in alignment, so that the axes of said inner and outer joint member are maintained in oblique axial relationship.

2. A homokinetic universal joint, as set forth in claim 1, wherein said first and second check pins are sized so that the angular relationship between the axes of said inner and outer joint members is not less than 20°.

* * * * *